(12) United States Patent
Haas

(10) Patent No.: US 6,532,275 B1
(45) Date of Patent: Mar. 11, 2003

(54) METHOD AND SYSTEM FOR SAFE MAIL TRANSMISSION

(75) Inventor: Bertrand J. Haas, New Haven, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/683,206

(22) Filed: Nov. 30, 2001

(51) Int. Cl.⁷ .................................. H05G 1/28
(52) U.S. Cl. ......................... 378/62; 378/162
(58) Field of Search ..................... 378/62, 63, 162

(56) References Cited

U.S. PATENT DOCUMENTS

| | | | |
|---|---|---|---|
| 3,933,094 A | 1/1976 | Murphy et al. | 101/426 |
| 4,317,030 A | 2/1982 | Berghell | 235/489 |
| 4,429,217 A | 1/1984 | Hill et al. | 235/380 |
| 4,446,204 A | 5/1984 | Kaule et al. | 428/323 |
| 4,540,887 A | 9/1985 | Minerd et al. | 250/561 |
| 4,723,072 A | 2/1988 | Naruse | 235/454 |
| 4,733,856 A | 3/1988 | Gunther, Jr. | 270/1.1 |
| 4,813,062 A * | 3/1989 | Gilpatrick | 378/162 |
| 4,828,104 A | 5/1989 | Ribellino, Jr. | 229/71 |
| 4,838,435 A | 6/1989 | Alexandre et al. | 209/555 |
| 4,908,768 A | 3/1990 | Gelfer et al. | 364/464.03 |
| 5,031,223 A | 7/1991 | Rosenbaum et al. | 382/1 |
| 5,036,190 A | 7/1991 | Lile et al. | 250/223 R |
| 5,036,984 A | 8/1991 | Labarthe | 209/313 |
| 5,067,088 A | 11/1991 | Schneiderhan | 364/478 |
| 5,288,994 A * | 2/1994 | Berson | 250/223 |

FOREIGN PATENT DOCUMENTS

WO  WO 90/12660  11/1990  ............. B07C/3/18

OTHER PUBLICATIONS

*X–Ray Data Booklet*—Lawrence Berkeley National Laboratory, University of California, Berkeley, California; Jan. 31, 2001.

* cited by examiner

*Primary Examiner*—Craig E. Church
(74) *Attorney, Agent, or Firm*—George M. Macdonald; Angelo N. Chaclas; Charles Malandra, Jr.

(57) ABSTRACT

A method and system for safe mail transmission is provided. A letter is created with a marking compound that provides contrast in a detection system. The letter is sealed in a protective enclosure and scanned when received.

6 Claims, 2 Drawing Sheets

METHOD AND SYSTEM FOR SAFE MAIL TRANSMISSION

BACKGROUND OF INVENTION

The embodiments described herein may be useful for the safe transmission of mail.

Anthrax spores have been detected on mail pieces, mail-handling equipment and in or near areas where certain mail pieces that likely contained anthrax were handled. Several people that were in such areas have contracted anthrax disease. These attacks pose a danger of infection that may be lethal to those in affected areas. Additionally, there is no readily available warning system to provide an early warning that a mail piece contains anthrax spores. Certain members of the general population may fear receiving and handling mail due to the threat of mail terrorism.

Physical threats have also been introduced into the mail system. Bombs have been sent through the mail system and have caused injury.

Anthrax is a biological agent that has apparently been placed in the U.S. postal delivery system in mail pieces that were camouflaged as ordinary mail and not properly marked or properly contained as a dangerous biological agent. The person placing such mail in the mail system had the apparent sole purpose of delivering the Anthrax as a biological weapon to kill the immediate victims and terrorize others who use the postal system. The Anthrax has apparently been transported in spore form and in such a small form as to float in the air.

SUMMARY OF INVENTION

In one embodiment, a mail image detector receives a hermetically sealed mail piece, illuminates the mail piece and detects an image. The detected image may be sent to the recipient in electronic or hard copy form.

In another embodiment, a mail piece is created using at least one type of marking compound that can be detected through a protective envelope.

DETAILED DESCRIPTION

Anthrax has been introduced into the mail system as a biological weapon. Similarly, other hazardous biological or chemical materials might be similarly transported in a mail system. Accordingly, many people do not wish to open mail or only very reluctantly do so. Bulk mail decontamination systems may be very costly to operate, may destroy the mail piece and may not be effective against all biological and chemical weapons. Accordingly, safe methods of reading mail are desirable.

In a first embodiment, an illustrative example of a safe mail transmission system and method is described. A handwritten letter on common writing paper in a manila flat envelope is used as an example. An x-ray imaging device is utilized to read the contents of the letter. As discussed, other marking materials such as suspensions in ink of lead, barium or other substance that is very opaque to x-rays may be utilized. Additionally, other substrate materials could be utilized including cotton-based paper. Similarly, other envelopes could be utilized including Tyvek and transparent envelopes. A hermetically sealed heat sealed plastic envelope is described in the illustrative example, but other protective enclosures may be utilized.

Figure 1:
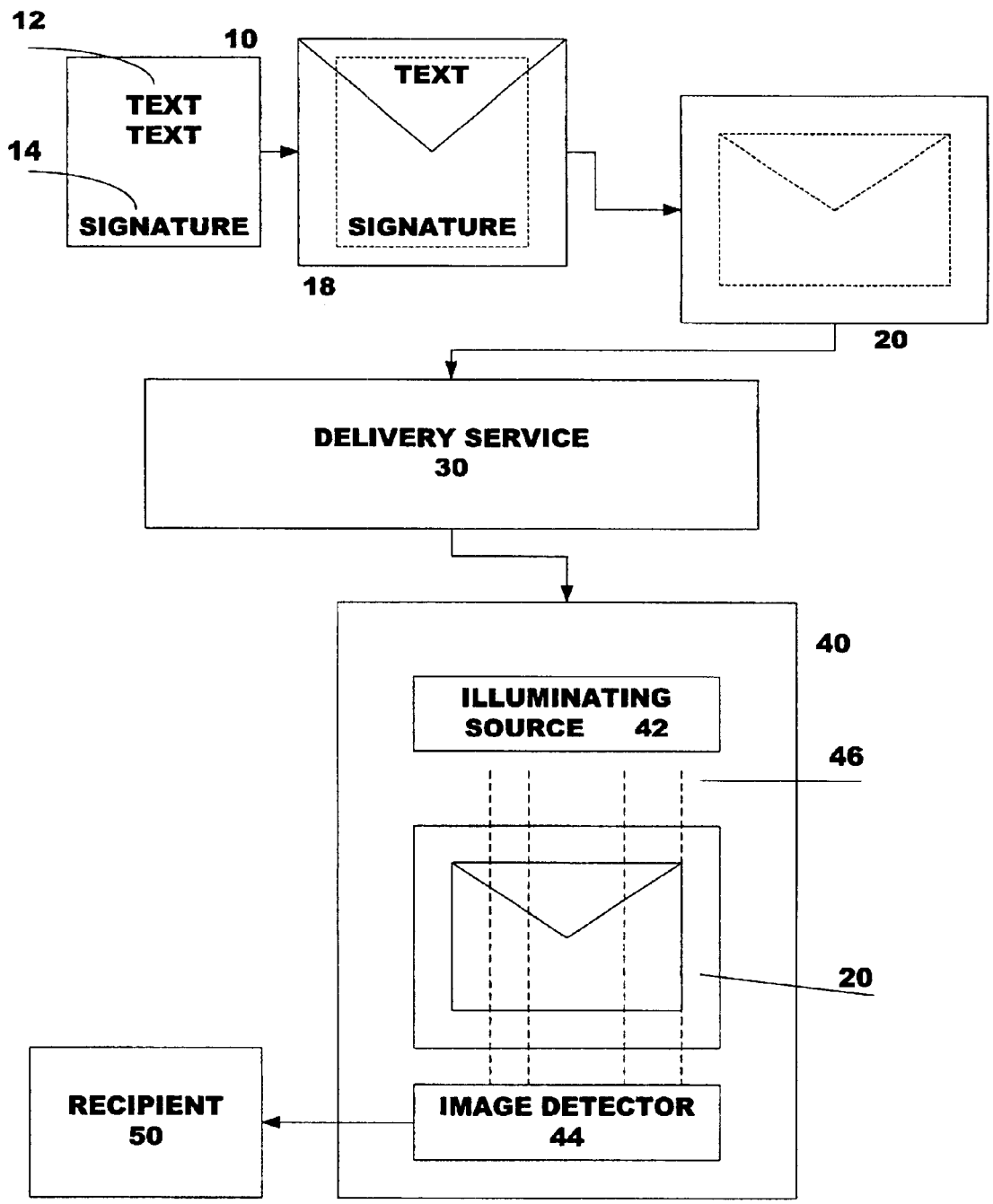
FIG. 1 is a diagrammatic representation illustrating a safe mail image detection system according to an embodiment of the present application.

Referring to FIG. 1, a first embodiment is described. A single sheet of substrate such as ordinary typing/copy paper of 20 lb. Weight Boise Cascade X-9000 10 is marked or written on using a pencil with a lead core (not shown). The pencil does not have a graphite core, but rather a lead core. Such a pencil will allow for a hand-written signature. After writing the page, the lead may be coated with a fixing material such as common hairspray to fix the writing to the page. A lead pencil will provide better contrast to x-rays than graphite. Accordingly, softer x-rays may be utilized. X-ray sources and detectors are well known and not described in detail. X-ray sources and detectors are in use in areas such as hospitals, dental offices and airports. Similarly, ink with a suspension of lead may be utilized in pens, printers or typewriters. As discussed below, graphite pencils and other marking materials may be utilized.

The markings include text markings 12 and signature markings 14. Once completed, the page 10 is placed unfolded in a flat ten-inch×thirteen-inch manila envelope 18 that is addressed (not shown). The markings 12, 14 are placed only on one page or side of the sheet 10 and the sheet is placed unfolded in the envelope 18. The envelope is placed in a hermetically sealed container 20 such as a plastic envelope. In a preferred embodiment, the package is vacuum-sealed.

The sealed package 20 is placed with a delivery service 30 such as the United States Postal Service for pre-paid delivery. Other delivery services and delivery service options may be utilized including return receipt. The delivery service labels (not shown), if required, preferably securely adhere to the sealed package 20, but preferably are easily removed.

The delivery service 30 delivers the package to the safe mail handling system 40. The sealed package preferably has a smooth surface that is easily decontaminated and is preferably opaque.

The sealed package 20 is placed such that the illuminating source 42 passes illumination 46 through the package 20 to image detector 44. The illuminating source in this embodiment is a soft x-ray source such as one utilizing a fiber wave guide. The image detector 44 is an x-ray detector that uses x-ray properties to contrast the markings 12, 14 with the substrate 10, envelope 18 and protective enclosure 20. The image is then sent to the recipient 50 in electronic form or may be printed and sent to the recipient 50 in hard copy format.

In an alternative embodiment, the protective enclosure 20 is decontaminated after receipt from the delivery service 30. In another alternative embodiment, the recipient delivery service places the envelope 18 in the protective enclosure 20 after receipt from the delivery service 30.

X-ray imaging technology is well known. Heavy metal marking materials provide such good contrast that softer x-rays may be utilized for detection. Soft x-ray imaging technology is known and the softer x-ray systems in the range of soft x-ray systems are generally more economical.

A periodic table of x-ray properties of elements and other x-ray properties are available in the January 2001 X-ray Data Booklet and tables available from the Center for X-ray Optics and Advanced Light Source of Lawrence Berkeley National Laboratory at the University of California at Berkeley, Calif. that is incorporated by reference.

Figure 2:
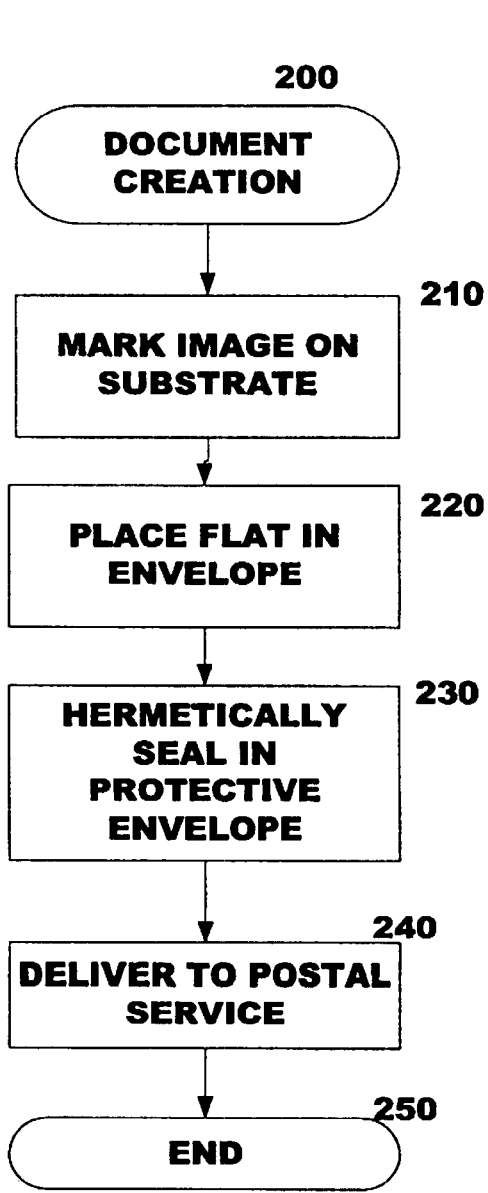
FIG. 2 is a flow chart showing a process for safe mail document creation according to an embodiment of the present application.

Referring to FIG. 2, an embodiment for document creation is described. The document creation method begins at step 200. In step 210, the user marks an image on a substrate. As discussed above, more than one contrasting marking material may be utilized. As can be appreciated, multi-page documents may be created and detected using varying contrast marking materials on each successive page. In step 220, the substrate is placed unfolded in an envelope. In step 230, the envelope is placed in a protective envelope and hermetically sealed. In step 240 the package is delivered to the postal service. The document creation process ends at step 250.

Figure 3:
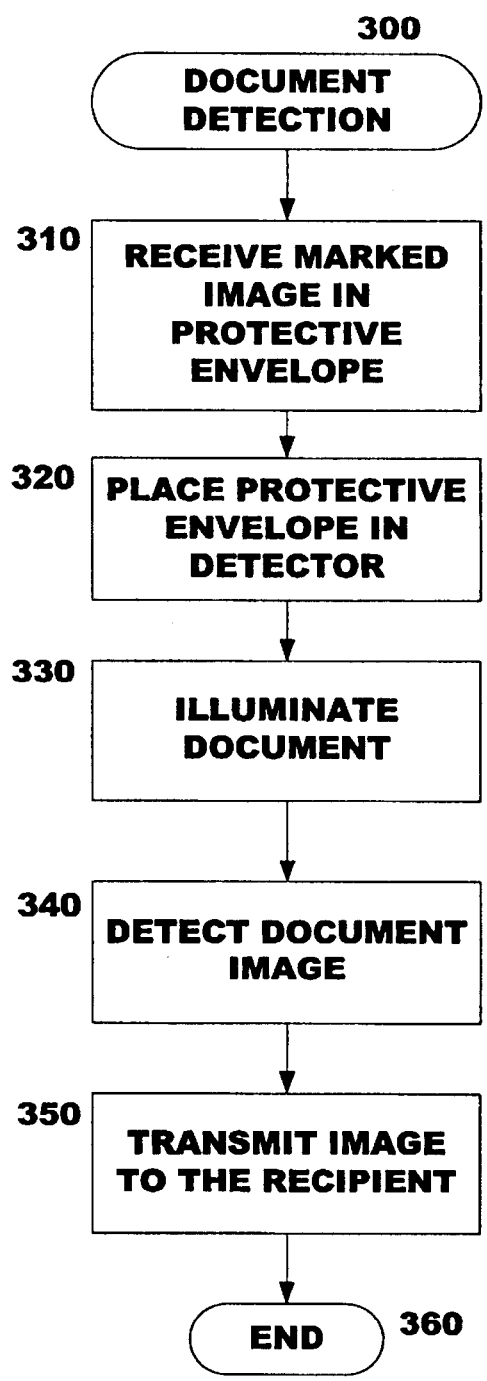
FIG. 3 is a flow chart showing a process for safe mail document detection according to an embodiment of the present application.

Referring to FIG. 3, an embodiment for document detection is described. The document detection method begins at step 300. In step 310, the user receives a document in a protective envelope. In step 320, the user places the protective envelope in the detector. In step 330, the user initiates the illumination of the document. In step 340, the user initiates the detection of the document image that may include OCR processing and back up filing. In step 350, the user transmits the document image to the recipient. The document detection process ends at step 360. The original document may be cataloged and stored in the protective enclosure for future reference if needed. The detected image may be printed for hard copy delivery.

In an alternative embodiment, if a user receives an envelope without a protective enclosure, the user may place a received document in a protective envelope before detecting the document.

Other contrasting materials and detection systems may be utilized. Additionally, other radiation sources and detectors may be utilized as described below.

In another embodiment, pencils typically known as lead pencils may be manufactured using graphite that is also known as black lead or pencil ore. As discussed above, a lead compound will provide better contrast. Graphite is typically carbon mixed with clay that may be composed of hydrous aluminum silicates. Such marking materials generally are contrastable from the substrate paper and the envelope and protective hermetically sealed envelope, but will require relatively high-energy x-ray equipment that is more costly to acquire and operate and may require specific tuning for the materials used.

In another embodiment, toner systems used in copiers and laser printers may be laced with ferrous materials in the toner cartridge. Materials such as iron will provide contrast to paper products under x-ray illumination. Another such material used for medical x-rays is barium. Such a toner will provide a contrast against the substrate and packaging material to a detector when subjected to an x-ray source. Additionally, toner cartridges using MICR ink are known to have ferrous components. Accordingly, existing marking substances may be utilized, but finer x-ray imaging equipment is required that will produce slower scans.

In an alternative embodiment, other radiation sources may be utilized. In one embodiment, a high intensity light source is used to illuminate the envelope and a detector such as a CCD detector reads the entire illuminated image. Various wavelengths may be utilized including the visible spectrum and infrared spectrum. If light is used with transparent enclosure or enclosures, a reflecting scanner may be used.

In another alternative embodiment, a magnetic field may be utilized instead of x-rays. A standard Magnetic Ink Character Recognition (MICR) toner cartridge is utilized and a new full page MICR detector is utilized to image the document. MICR recognition technology includes waveform and matrix read technologies that can be implemented with Optical Character Recognition (OCR) technology to read checks after they are removed from an envelope. The typically small MICR read heads are enlarged to provide a full-page array, a single scanning column or other full page read design.

In an alternative embodiment, an ultrasonic source and detector are utilized. Ultrasonic imaging systems are known and materials that provide contrast in such systems are known. Accordingly, an ultrasonic imaging system is utilized whereby the correspondence is created with a marking composition such as ink that provides contrast from the substrate and packaging materials when subjected to an ultrasonic source. A greatly contrasting marking material such as gold suspended in ink is preferably utilized.

In further embodiments, the methods described above are utilized in multi-sheet applications for applications including secure addressing.

U.S. Pat. No. 5,288,994 ("'994 patent"), issued to Berson on Feb. 22, 1994 is commonly assigned with the present application to Pitney Bowes Inc. and is incorporated herein by reference. The '994 patent describes address verification using an infrared source for partial scans of material through a sealed envelope.

In another embodiment, a process for handling confidential material utilizes two-stage address processing. A mailpiece comprises an outer opaque enclosure having preliminary address information readable to the naked eye and that preferably addresses the envelope to a first secure distribution point. Inside the envelope, the package has a single sheet marked with final address information for the package using the detectable marking methods described above and additional materials that are not marked with lead. Accordingly, the first secure distribution operator can detect the final address and properly route the package. Accordingly, the first courier is not aware of the final destination for the package that may include multiple sheets of paper or other materials. The package may include a frangible seal such as a label to indicate if the package has been tampered with. The package may also include a radiation detector to determine if someone has previously attempted to read the document using x-rays.

In another embodiment, the mail-piece may not have an address on the outer envelope and may be delivered by a courier having knowledge of the location of the first distribution point. In a further embodiment, the final address information may be encrypted or otherwise encoded. The final address information may include a key for an encryption system to decode an address or a document or part of a document that is in the package, but not necessarily written in the contrasting ink.

The present application describes embodiments of a system and method for the safe transmission of mail. The embodiments are illustrative and where alternative elements are described, they are understood to fully describe alternative embodiments without repeating common elements. The processes described provide useful results including but not limited to increasing the safety of mail handling processes. The embodiments discussed herein apply to letter correspondence for illustrative purposes, but other types of documents may be utilized.

The described embodiments are illustrative and the above description may indicate to those skilled in the art additional ways in which the principles of this invention may be used without departing from the spirit of the invention. Accordingly the scope of the claims should not be limited by the particular embodiments described.

What is claimed is:

1. A method for creating a document that may be detected from within a protective enclosure comprising:

marking document contention a substrate of the document using a marking substance that is detectable by an x-ray detector;

placing the substrate in an opaque envelope;

placing the envelope in the protective enclosure;

sealing the protective enclosure; and transporting the protective enclosure to a delivery service.

2. The method of claim 1 further comprising:

marking a first portion of the document with a first marking material; and marking a second portion of the document with a second marking material.

3. The method of claim 1 wherein the substrate is 20-pound paper.

4. The method of claim 1 wherein the envelope is a manila envelope.

5. The method of claim 1 wherein the protective enclosure is hermetically sealed.

6. The method of claim 1 wherein the delivery service is the United States Postal Service.

* * * * *